UNITED STATES PATENT OFFICE.

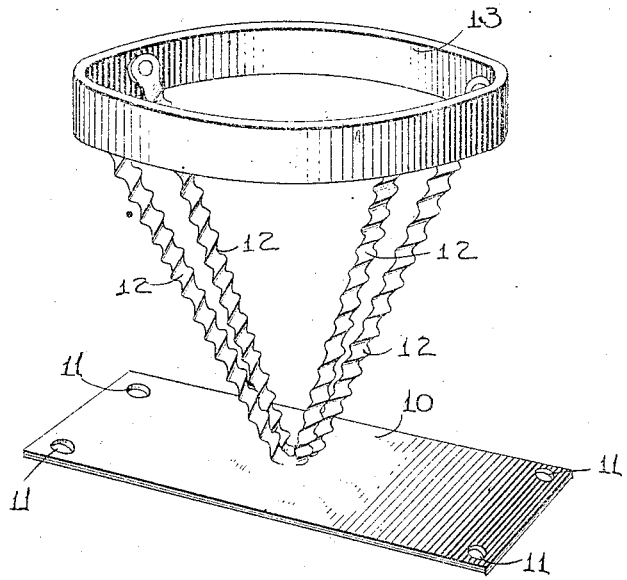
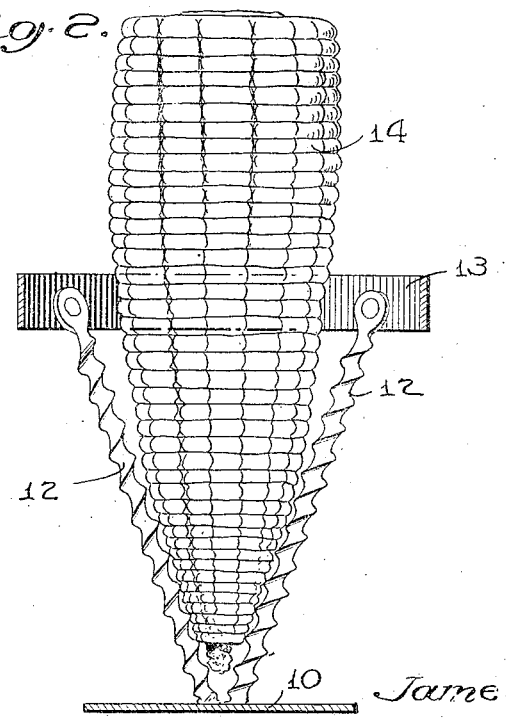

JAMES HUNT, OF CONRAD, IOWA.

CORN-TIPPER.

1,049,095. Specification of Letters Patent. Patented Dec. 31, 1912.

Application filed June 17, 1912. Serial No. 704,145.

*To all whom it may concern:*

Be it known that I, JAMES HUNT, a citizen of the United States, residing at Conrad, in the county of Grundy and State of Iowa, have invented certain new and useful Improvements in Corn-Tippers, of which the following is a specification, reference being had therein to the accompanying drawing.

This invention relates to corn tippers, and the principal object of the invention is to provide a device with which the kernels at the outer end of the ear of corn may be removed before placing the ear of corn in a shelling machine. It very often happens that the kernels at the outer end of the corn are either too small to be of any value, or are decayed or worm eaten. It is, therefore, desired to remove these kernels at the end of the ear before inserting the ear of corn in the shelling machine which removes the remaining kernels from the cob of corn so that they may be ground into corn meal.

With the above and other objects in view, the invention consists in general of certain novel details of construction and combinations of parts hereinafter fully described, illustrated in the accompanying drawings, and specifically claimed.

This invention is illustrated in the accompanying drawings, wherein:—

Figure 1 is a perspective view of the device. Fig. 2 is a vertical sectional view showing the device in use.

Referring to the accompanying drawings, it will be seen that this invention comprises the base plate 10 which is provided with openings 11 through which securing bolts or screws may be passed so that the device may be rigidly secured to a suitable support. Diverging arms 12 which are formed from twisted rod metal, extend from the central portion of the base plate 10 and have their upper ends connected with the hoop 13. This hoop holds the outer ends of the rods 12 so that when in use, the rods will not be spread apart when the ear of corn is placed in between them as shown in Fig. 2.

When using this device, the ear of corn is inserted through the hoop with its outer ends extending down between the lower ends of the rods 12. After the ear of corn is in place, the ear is turned upon the sharp edges of the twisted rods which cut the kernels from the end of the cob. The upper portions of the rods 12 do not come in contact with the cob and, therefore, the kernels along the major portion of the cob will not be cut and interfered with. It will, therefore, be seen that there has been provided a very efficient device for removing the small or defective kernels at the outer end of the cob without the large kernels along the major portion of the cob being cut or removed.

Having thus described the invention, what is claimed as new, is:—

1. A device of the character described comprising a base plate, twisted cutting rods extending from said base plate in diverging relation, and means connecting the upper ends of said rods.

2. A device of the character described comprising a base plate provided with openings for receiving fastening means, twisted cutting rods extending from the center of said base plate in diverging relation, and a hoop carried by the upper ends of said rods to prevent spreading of the rods when an article is inserted between the rods.

3. A device of the character described comprising twisted cutting rods, means connecting the upper ends of said rods, and means connecting the lower ends and being adapted for attachment to a support.

In testimony whereof I hereunto affix my signature in presence of two witnesses.

JAMES HUNT.

Witnesses:
 F. C. WITZIGMAN,
 EM. STARCK.